(12) United States Patent
Cho et al.

(10) Patent No.: US 8,669,008 B2
(45) Date of Patent: Mar. 11, 2014

(54) NEGATIVE-ELECTRODE ACTIVE MATERIAL FOR RECHARGEABLE LITHIUM BATTERY

(75) Inventors: Jaephil Cho, Gyeonggi-do (KR); Jae-Bum Choo, Gyeonggi-do (KR); Byung-Hee Han, Gyeonggi-do (KR); Hyun-Jung Kim, Daegu (KR); Ki-Tae Kim, Daejeon (KR); Je-Young Kim, Daaejeon (KR)

(73) Assignees: LG Chem, Ltd. (KR); UNIST Academy-Industry Research Corporation (KR)

( * ) Notice: Subject to any disclaimer, the term of this patent is extended or adjusted under 35 U.S.C. 154(b) by 129 days.

(21) Appl. No.: 13/239,912

(22) Filed: Sep. 22, 2011

(65) Prior Publication Data

US 2012/0077087 A1 Mar. 29, 2012

Related U.S. Application Data

(63) Continuation of application No. PCT/KR2009/002622, filed on May 18, 2009.

(30) Foreign Application Priority Data

Apr. 13, 2009 (KR) .................. 10-2009-0031974
May 15, 2009 (KR) .................. 10-2009-0042527

(51) Int. Cl.
*H01M 4/58* (2010.01)
*H01M 4/38* (2006.01)
*H01M 4/04* (2006.01)
*B82B 3/00* (2006.01)
*H01M 10/058* (2010.01)

(52) U.S. Cl.
USPC ........ 429/231.8; 252/502; 977/755; 977/773; 977/780

(58) Field of Classification Search
USPC .............. 429/219, 220–224, 226, 229, 231.5, 429/231.6, 231.8; 252/502; 977/755, 773, 977/780, 844
See application file for complete search history.

(56) References Cited

U.S. PATENT DOCUMENTS

| | | | |
|---|---|---|---|
| 6,440,610 | B1 | 8/2002 | Sheem et al. |
| 6,770,399 | B2 | 8/2004 | Umeno et al. |
| 6,878,487 | B2 | 4/2005 | Cho et al. |
| 7,767,346 | B2 | 8/2010 | Kim et al. |
| 2004/0214085 | A1 | 10/2004 | Sheem et al. |
| 2008/0274403 | A1 | 11/2008 | Kim et al. |
| 2009/0029256 | A1 | 1/2009 | Mah et al. |

FOREIGN PATENT DOCUMENTS

| | | |
|---|---|---|
| JP | 2001-250542 A | 9/2001 |
| JP | 2002-216751 A | 8/2002 |
| JP | 2005-158721 A | 6/2005 |
| KR | 2001-0055503 A | 7/2001 |

(Continued)

OTHER PUBLICATIONS

Kim et al., Angew. Chem. Int. Ed. 2008, 47; 10151-10154.

*Primary Examiner* — Gregg Cantelmo
(74) *Attorney, Agent, or Firm* — Lerner, David, Littenberg, Krumholz & Mentlik, LLP

(57) ABSTRACT

The present invention relates to negative-electrode active material for rechargeable lithium battery comprising: a core comprising material capable of doping and dedoping lithium; and, a carbon layer formed on the surface of the core, wherein the carbon layer has a three dimensional porous structure comprising nanopores regularly ordered on the carbon layer with a pore wall of specific thickness placed therebetween.

18 Claims, 13 Drawing Sheets

(56) References Cited

FOREIGN PATENT DOCUMENTS

| | | |
|---|---|---|
| KR | 10-0441513 | 3/2003 |
| KR | 2004-0063802 A | 7/2004 |
| KR | 2005-0065067 A | 6/2005 |
| KR | 10-0759556 | 4/2007 |
| KR | 2007-0041900 A | 4/2007 |
| KR | 10-0790852 B1 | 1/2008 |
| KR | 2008-0098261 A | 11/2008 |
| KR | 2009-0011888 A | 2/2009 |
| WO | 2007069664 A1 | 6/2007 |
| WO | 2007-094240 A1 | 8/2007 |
| WO | 2008020620 A1 | 2/2008 |

US 8,669,008 B2

NEGATIVE-ELECTRODE ACTIVE MATERIAL FOR RECHARGEABLE LITHIUM BATTERY

CROSS-REFERENCE TO RELATED APPLICATIONS

This application is a continuation-in-part of International Application No. PCT/KR2009/002622 filed on May 18, 2009, published in Korean, which claims priority to Korean Patent Application No. 10-2009-0031974 filed on Apr. 13, 2009, and Korean Patent Application No. 10-2009-0042527 filed on May 15, 2009, the entire contents of which are incorporated herein by reference.

BACKGROUND OF THE INVENTION

The present invention relates to negative-electrode active material for rechargeable lithium battery, method of preparing the same, and rechargeable lithium battery comprising the same.

A battery generates electrical power using materials capable of electrochemical reaction for positive electrode and negative electrode. A representative example of the battery is rechargeable lithium battery which produces electrical energy by change in chemical potential at intercalation/deintercalation of lithium ion in positive electrode and negative electrode.

The rechargeable lithium battery is prepared using materials capable of reversible interclataion/deintercalation of lithium ion as positive- and negative-electrode active materials, by filling organic electrolyte or polymer electrolyte between the positive electrode and negative electrode.

As positive-electrode active material for rechargeable lithium battery, lithium complex metal compound is used, and for examples, complex metal oxides such as $LiCoO_2$, $LiMn_2O_4$, $LiNiO_2$, $LiNi_{1-x}Co_xO_2$ (0<x<1), $LiMnO_2$, etc. are studied.

As negative-electrode active material for rechargeable lithium battery, carbon materials of various forms including artificial graphite, natural graphite and hard carbon capable of intercalation/deintercalation of lithium have been used. Especially, graphite has low discharge voltage of −0.2V vs lithium, and thus, battery using it as negative-electrode active material shows high discharge voltage of 3.6V. Thus, the graphite active material provides advantage in terms of energy density of lithium battery, and secures long life of rechargeable lithium battery due to excellent reversibility, and thus is most widely used. However, graphite active material has problems in that when preparing an electrode plate, capacity is low in terms of energy density per unit volume of the electrode plate due to low density of graphite (theoretical density 2.2 g/cc), and there is riskiness of ignition or explosion due to misoperation and overcharge of battery because side reaction with organic electrolyte easily occurs at high discharge voltage.

Thus, inorganic active materials such as Si have been studied. The Si inorganic negative-electrode active material is known to form $Li_{4.4}Si$ to show high lithium capacity of about 4200 mAh/g. However, it causes large volume change of 300% or more at intercalation/deintercalation of lithium, namely at charge/discharge. Thereby, pulverization of negative-electrode active material occurs, and the pulverized particles are condensed to cause electrical deintercalation of negative-electrode active material from current collector. The electrical deintercalation may largely decrease capacity retention ratio and cycle life property of battery. Therefore, in order to inhibit volume change of inorganic negative-electrode active material, studies for preparing carbon/Si nanoparticle composite to use it as negative-electrode active material have been progressed. In the carbon/Si nanoparticle composite, carbon functions as electrical conductor, thus improving capacity retention ratio of battery to some extent. However, in order to obtain relatively excellent capacity retention ratio, carbon content should exceed 50 wt % in the composite, which may lower capacity itself, and even if excessive amount of carbon is included, capacity decreases to less than 1500 mAh/g after 50 cycles.

BRIEF SUMMARY OF THE INVENTION

The present invention provides negative-electrode active material for rechargeable lithium battery having excellent cycle life property.

Further, the present invention provides a method for preparing the negative-electrode active material for rechargeable lithium battery.

Furthermore, the present invention provides rechargeable lithium battery comprising the negative-electrode active material for rechargeable lithium battery According to one embodiment, the present invention provides negative-electrode active material for rechargeable lithium battery comprising: a core comprising material capable of doping and dedoping lithium; and, a carbon layer formed on the surface of the core, wherein the carbon layer has a three dimensional porous structure comprising nanopores having average diameter of about 100 to 300 nm, regularly ordered on the carbon layer with a pore wall having thickness of about 40 to 150 nm placed therebetween.

The negative-electrode active material for rechargeable lithium battery may have peak at about 100 eV and/or about 104 eV, and may not have any substantial peak at about 105 eV and about 110 eV in the X-ray photoelectron spectroscopy graph (XPS graph).

In the negative-electrode active material, after conducting charge/discharge, the average diameter of the nanopores may be about 30 to 150 nm, and the thickness of the pore wall between the nanopores may be about 40 to 120 nm.

The material capable of doping and dedoping lithium may comprise one or more kinds of Group 14 or 15 element-containing material, selected from the group consisting of Si, $SiO_x$(0<x<2), Si—$Y_1$ alloy, Sn, $SnO_2$, Sn—$Y_2$, Sb and Ge (wherein, $Y_1$ and $Y_2$ are one or more kinds of atoms selected from the group consisting of alkali metals, alkaline earth metals, Group 13 atoms, Group 14 atoms, transition metals and rare earth atoms, provided that $Y_1$ is not Si, and $Y_2$ is not Sn). And, $Y_1$ and $Y_2$ may be one or more kinds of atoms capable of binding with Si or Sn, selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Si, Sn, In, Ti, Ge, P, As, Sb, Bi, S, Se, Te, and Po.

The material capable of doping and dedoping lithium in the core may exist as multiple particles, and carbon materials may be further comprised between the multiple particles.

The core may further comprise an oxide of the material capable of doping and dedoping lithium, as well as the material capable of doping and dedoping lithium.

The material capable of doping and dedoping lithium may have a crystalline structure, and crystalline grain in the crystalline structure may have an average diameter of about 20 to 100 nm.

The material capable of doping and dedoping lithium may have a structure comprising crystalline grains dispersed in an amorphous matrix, after conducting charge/discharge. And, the dispersed crystalline grain may have an average diameter of about 2 to 5 nm.

The carbon layer may have a thickness of about 1 to 30 nm, and it may comprise disordered carbon. And, it may have a Raman integrated intensity ratio D/G (I(1360)/I(1580)) of about 0.1 to 2.

The negative-electrode active material may comprise about 5 to 40 wt % of carbon, based on the total amount of the negative-electrode active material for rechargeable lithium battery.

The negative-electrode active material may have specific surface area of about 50 to 200 $m^2/g$.

According to another embodiment, the present invention provides a method for preparing negative-electrode active material for rechargeable lithium battery comprising the steps of: modifying material capable of doping and dedoping lithium with organic functional groups; mixing the material capable of doping and dedoping lithium modified with the organic functional group with inorganic oxide; heating the mixture; and, removing the inorganic oxide.

In the method, a composite formed after the heating step may comprise a core comprising the material capable of doping and dedoping lithium; and a carbon layer formed on the surface of the core, wherein the inorganic oxide particle is stuck in the carbon layer.

The organic functional group may be an organic group represented by $C_nH_m$ (wherein, n and m are integer of 1 or more).

The organic functional group may be selected from the group consisting of aliphatic organic group having carbon number of from 1 to 30, cycloaliphatic organic group having carbon number of from 3 to 30, and aromatic organic group having carbon number of from 6 to 30.

The inorganic oxide may comprise one or more kinds of inactive inorganic oxide, selected from the group consisting of silica, alumina, titania, ceria and zirconia.

The inorganic oxide may be added in an amount of about 10 to 80 parts by weight, based on 100 parts by weight of the material capable of doping and dedoping lithium modified with the organic functional group.

The material capable of doping and dedoping lithium modified with the organic functional group may be in the form of viscous gel.

The step of heating can be conducted under vacuum or inert atmosphere.

The step of heating can be conducted at about 700 to 1200° C., and the step of removing the inorganic oxide can be conducted using basic or acidic material.

According to another embodiment, the present invention provides rechargeable lithium battery comprising a positive electrode comprising positive-electrode active material; a negative electrode comprising the above described negative-electrode active material; and, an electrolyte.

The rechargeable lithium battery may show about 94% or more of coulombic efficiency after conducting 30 cycles or more of charge and discharge.

Other details of embodiments of the present invention are described herein below.

BRIEF DESCRIPTION OF THE DRAWINGS

FIG. 3b is 20-fold magnified view of FIG. 3a.

FIG. 3c is 100-fold magnified view of FIG. 3a.

FIG. 4b is 20-fold magnified view of FIG. 4a.

FIG. 5b is cross-sectional view of FIG. 5a.

DETAILED DESCRIPTION

Figure 1:
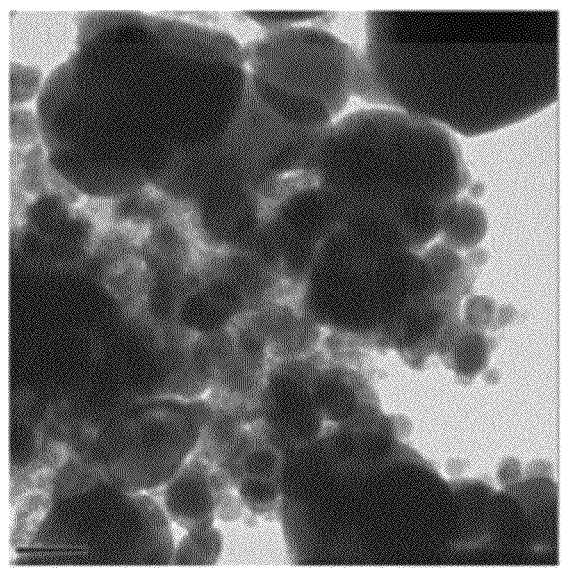
FIG. 1 is SEM photograph of negative-electrode active material for rechargeable lithium battery of Reference Example 2.

Embodiments of the present invention will now be explained in detail. However, these are only to illustrate the invention, and the invention is not limited thereto and it is defined by the claims.

Negative-electrode active material for rechargeable lithium battery according to one embodiment of the invention comprises: a core comprising material capable of doping and dedoping lithium; and, a carbon layer formed on the surface of the core, wherein the carbon layer has a three dimensional porous structure. The three dimensional porous structure comprises multiple nanopores which are regularly ordered on the carbon layer with a pore wall placed therebetween.

The term "nanopore" herein means an internal three dimensional space at least a part of which is surrounded by a pore wall formed by carbon of the carbon layer, and the diameter thereof is referred to as "nanopore diameter". Unless there is other clear description such as "after conducting charge/discharge" herein, the nanopore diameter means the initial diameter of the nanopore before charge/discharge of the rechargeable lithium battery comprising negative-electrode active material is conducted.

And, the "pore wall" means a wall formed between the nanopores to make a boundary thereof, and the "nanopore wall thickness" means the thickness of the wall, specifically a distance or an interval between the nanopores.

And, the description "regularly ordered" means that the nanopores are arranged continuously and regularly at a specific interval, for example, with a pore wall having uniform thickness placed therebetween.

And, the three dimensional porous structure means a structure comprising multiple nanopores which are ordered regularly and three-dimensionally at a specific interval of uniform pore wall thickness over at least a specific surface area of the carbon layer.

In the negative-electrode active material, the nanopores are regularly ordered on the carbon layer with a boundary of the pore wall having uniform thickness, and thus, when the volume of active material changes by charge/discharge of lithium, for example, the volume of "material capable of doping and dedoping lithium" comprised in the core expands/contracts, the nanopores and nanopore wall can function as a buffer layer for the volume change.

Specifically, in the negative-electrode active material, on a carbon layer having a thickness of several tens nm or less, multiple nanopores having large diameter which could not be achieved in the prior art, for example, an average diameter of about 100 to 300 nm, more specifically about 100 to 150 nm, about 150 to 200 nm, about 200 to 250 nm, or about 250 to 300 nm, are ordered, and, the nanopores are regularly ordered with a boundary of a pore wall having relatively thin thickness, for example uniform thickness of about 40 to 150 nm, more specifically about 40 to 80 nm, about 80 to 120 nm, or about 120 to 150 nm. Thus, the nanopores and the pore wall can effectively buffer volume change of active material occurred at charge/discharge of lithium. For this reason, the negative-electrode active material and rechargeable lithium battery comprising the same can exhibit excellent capacity retention ratio and cycle life property.

And, in the negative-electrode active material, since nanopores having relatively large diameter are ordered regularly and three-dimensionally, the nanopores can be filled with electrolyte thereby increasing area in contact with electrolyte and facilitating doping and dedoping of lithium. Especially, since the nanopores are regularly ordered with a pore wall having uniform and thin thickness placed therebetween, electrolyte of rechargeable lithium battery can uniformly diffuse at a part in contact with negative electrode surface, and the thin pore wall of uniform dimension functions for shortening the path of lithium ion and electrons at charge/discharge of rechargeable lithium battery.

Therefore, the negative-electrode active material and rechargeable lithium battery comprising the same can exhibit more improved capacity property and high rate property.

Meanwhile, in the negative-electrode active material, the core may further comprise, in addition to the material capable of doping and dedoping lithium, oxides thereof.

And, after conducting charge/discharge, the nanopore may have average diameter of about 30 to 150 nm, more specifically about 30 to 60 nm, about 60 to 100 nm, or about 80 to 150 nm. Since nanopores maintain average diameter in the above range even after conducting charge/discharge of rechargeable lithium battery, they can maintain more excellent buffering effect at volume expansion/contraction of negative-electrode active material.

And, after conducting charge/discharge, the thickness of the pore wall may be about 40 to 120 nm, more specifically about 40 to 60 nm, about 60 to 90 nm, or about 70 to 120 nm. Since the pore wall maintains thickness in the above range even after conducting charge/discharge, it can maintain excellent buffering effect at volume expansion/contraction of negative-electrode active material, and the negative-electrode active material can exhibit more excellent capacity retention ratio and cycle life property.

Although the average diameter of nanopores and thickness of pore wall change after conducting charge/discharge, the form of the negative-electrode active material for rechargeable lithium battery remains unchanged, thereby maintaining excellent cycle life property.

In the negative-electrode active material, the core comprising material capable of doping and dedoping lithium may have average diameter of about 10 to 50 μm, more specifically about 10 to 20 μm, about 20 to 40 μm, or about 30 to 50 μm, but not limited thereto.

And, the material capable of doping and dedoping lithium may comprise Group 14 or 15 element-containing material, for example, one or more kinds of the material selected from the group consisting of Si, $SiO_x$ (0<x<2), Si—$Y_1$ alloy, Sn, $SnO_2$, Sn—$Y_2$, Sb and Ge (wherein $Y_1$ and $Y_2$ is one or more kinds of atoms selected from the group consisting of alkali metals, alkaline earth metals, Group 13 atoms, Group 14 atoms, transition metal and rare earth atoms, provided that $Y_1$ is not Si, and $Y_2$ is not Sn). More specifically, $Y_1$ and $Y_2$ is one or more kinds of atom capable of binding with Si or Sn, for example, one or more kinds of atom selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Si, Sn, In, Ti, Ge, P, As, Sb, Bi, S, Se, Te and Po.

The structure of the core comprising the material capable of doping and dedoping lithium can be defined by one or more peak in the X-ray photoelectron spectroscopy graph (XPS graph). For example, in the XPS of the negative-electrode active material, a characteristic peak corresponding to silicon or SiOx (0<x<2) in the core is showed at about 100 eV and/or about 104 eV. Also, any substantial peak corresponding to inorganic oxide such as silica, which is used in preparation of the negative-electrode active material, is not showed at about 105 eV and about 110 eV. The term of "characteristic peak" means one or two peaks having highest intensity in the XPS graph of a certain material. Also, the term of "substantial peak" means a detectable peak in the XPS graph of a certain material.

And, in the core, the material capable of doping and dedoping lithium may exist as multiple particles, and carbon material may be further comprised between the multiple particles.

Each particle of the material capable of doping and dedoping lithium may comprise crystalline grain, and the average diameter of the crystalline grain may be about 20 to 100 nm, more specifically about 20 to 40 nm, about 30 to 60 nm, or about 60 to 100 nm. If the average diameter of the crystalline grain is controlled in the above range, amorphous matrix can sufficiently form after conducting charge/discharge.

After conducting charge/discharge, the structure of the material capable of doping and dedoping lithium in the core may change from crystalline to amorphous. In this case, the material capable of doping and dedoping lithium in the core may have a structure comprising crystalline grains dispersed in an amorphous matrix. The dispersed crystalline grain may have average diameter of about 2 to 5 nm, specifically about 2 to 3 nm or about 3 to 5 nm, and in this range, the formation of amorphous matrix is facilitated. The amorphous matrix may function for buffering at volume expansion/contraction due to charge/discharge, thereby more improving cycle life property.

In the negative-electrode active material, the thickness of the carbon layer formed on the core surface may be about 1 to 30 nm, more specifically about 5 to 10 nm, about 10 to 15 nm, or about 15 to 25 nm. If the thickness of the carbon layer is in the above range, a three-dimensional porous structure forms satisfactorily on the carbon layer without excessively increasing carbon content, thereby effectively buffering volume change of active material at charge/discharge, and thus, sufficient high rate property and sufficient capacity can be obtained.

In case the carbon layer comprises disordered carbon (low crystalline carbon), appropriate electrical conductivity can be obtained, and the Raman integrated intensity ratio D/G (I(1360)/I(1580)) of the carbon layer may be about 0.1 to 2, more specifically about 0.1 to 1.5, about 0.5 to 1.6, or about 0.9 to 1.8. If Raman integrated intensity ratio D/G of the carbon layer is in the above range, desired electrical conductivity can be obtained.

And, in the negative-electrode active material for rechargeable lithium battery, the content of carbon may be about 5 to 40 wt %, more specifically about 5 to 15 wt %, about 10 to 30 wt %, or about 20 to 40 wt %, based on the total amount of the negative-electrode active material. If the content of carbon is in the above range, desired capacity and high rate property can be obtained.

The negative-electrode active material for rechargeable lithium battery may have specific surface area of about 50 to 200 m$^2$/g, specifically about 50 to 160 m$^2$/g, more specifically about 100 to 160 m$^2$/g. Since multiple nanopores having relatively large diameter are regularly ordered on the carbon layer with a boundary of uniform and thin pore wall to form the above-described three-dimensional porous structure, the negative-electrode active material can have larger specific surface area compared to known nanoparticle composite. Thus, the area in contact with electrolyte increases, and doping and dedoping of lithium is activated to exhibit excellent capacity property and high rate property. And, as explained above, the regularly ordered nanopores and pore wall buffer volume change by charge/discharge of lithium more efficiently to achieve more improved capacity retention ratio and cycle life property. In addition, since the negative-electrode active material has appropriate specific surface area range, side reaction with electrolyte is reduced to decrease irreversible capacity.

According to another embodiment of the invention, a method for preparing the above described negative-electrode active material for rechargeable lithium battery is provided. The method comprises the steps of: modifying material capable of doping and dedoping lithium with organic functional groups; mixing the material capable of doping and dedoping lithium modified with the organic functional group with inorganic oxide; heating the mixture; and, removing the inorganic oxide.

As results of experiments, it was found that according to the above method, a carbon layer having a scale of several tens nm or less forms satisfactorily on the surface of core comprising material capable of doping and dedoping lithium, and on the carbon layer, multiple nanopores having large diameter of about 100 nm or more can be regularly formed and ordered, thus the negative-electrode active material for rechargeable lithium battery as explained above can be obtained. Especially, according to the method, in the step of removing inorganic oxide, multiple nanopores corresponding to the diameter of the oxide form, and thus, a three-dimensional porous structure comprising these nanopores that are regularly ordered with a boundary of pore wall having uniform thickness can form on the carbon layer. Therefore, by the method, the nanopores having relatively large diameter and pore wall having uniform thickness can effectively buffer volume change of active material at charge/discharge, and large specific surface area allows preparation of negative-electrode active material exhibiting excellent capacity and high rate properties.

The method will now be explained in more detail.

In the method, first, material capable of doping and dedoping lithium is modified by organic functional groups, thereby providing material capable of doping and dedoping lithium modified by organic functional group.

The material capable of doping and dedoping lithium modified by organic functional group can be made to exist in the form of viscous gel. After the material capable of doping and dedoping lithium modified with the organic functional group in the form of gel passes all the preparation process of negative-electrode active material for rechargeable lithium battery as explained below, the material capable of doping and dedoping lithium is included in a core, the organic functional group forms a carbon layer on the core surface, and the carbon layer may comprise nanopores on its surface. In the core, material capable of doping and dedoping lithium may exist as multiple particles, and carbon material may be further comprised between the multiple particles.

As the organic functional group, an organic group represented by $C_nH_m$(wherein, n and m are integer of 1 or more), specifically, a functional group selected from the group consisting of aliphatic organic group, cycloaliphatic organic group and aromatic organic group can be exemplified. For example, the aliphatic organic group may be those having carbon number of from 1 to 30 such as alkyl group having carbon number of from 1 to 30, specifically alkyl group having carbon number of from 1 to 15; alkenyl group having carbon number of from 2 to 30, specifically alkenyl group having carbon number of from 2 to 18; or, alkynyl group having carbon number of from 2 to 30, specifically alkynyl group having carbon number of from 2 to 18, the cycloaliphatic organic group may be those having carbon number of from 3 to 30 such as cycloalkyl group having carbon number of from 3 to 30, specifically cycloalkyl group having carbon number of from 3 to 18; cycloalkenyl group having carbon number of from 3 to 30, specifically cycloalkenyl group having carbon number of from 3 to 18; or, cycloalkynyl group having carbon number of from 3 to 30, specifically cycloalkynyl group having carbon number of from 5 to 18, and, the aromatic organic group may be those having carbon number of from 6 to 30 such as aryl group having carbon number from 6 to 30, specifically aryl group having carbon number of from 6 to 18. More concrete examples of the organic functional group include one or more kinds of functional groups selected from the group consisting of methyl, ethyl, propyl, butyl, cyclopropyl, cyclobutyl, cyclopentyl, cyclohexyl, and phenyl, but not limited thereto.

The process of modifying or protecting the material capable of doping and dedoping lithium with organic functional group is widely known in the art, and thus, although detailed explanation thereof is not included herein, it can be easily understood by a person having ordinary knowledge in the art.

Then, the material capable of doping and dedoping lithium modified with organic functional group is mixed with inorganic oxides.

After the mixing, the inorganic oxides are stuck in the surface of the material capable of doping and dedoping lithium modified with organic functional group, thereby forming a structure comprising the stuck inorganic oxides that are connected to each other.

As the inorganic oxides, one or more kinds of inactive inorganic oxide that does not react with the organic functional group can be used. The inorganic oxide may be one or more kinds of the inactive inorganic oxide selected from the group consisting of silica, alumina, titania, ceria and zirconia, but not limited thereto. Commercial inorganic oxides can be generally used.

The inorganic oxides can be nanoparticles, for example, nanoparticle having average diameter of about 100 to 300 nm, specifically about 100 to 150 nm, about 150 to 200 nm, about 200 to 250 nm, or about 250 to 300 nm. The shape of the nanoparticle can be spherical, but not limited thereto. If the average diameter of the inorganic oxide is in the above range, it can be easily mixed with the material capable of doping and dedoping lithium modified with organic functional group, thus easily stuck in the surface of the material, and even at rolling after removing the inorganic oxides, pores can be maintained without collapse.

The inorganic oxides can be added in an amount of about 10 to 80 parts by weight, specifically, 20 to 50 parts by weight, 30 to 60 parts by weight, or 40 to 80 parts by weight, based on 100 parts by weight of the material capable of doping and dedoping lithium modified with organic functional group. If the inorganic oxides are used in the above range, the negative-electrode active material for rechargeable lithium battery can be more easily prepared.

The material capable of doping and dedoping lithium modified with organic functional group may be in the form of viscous gel, and in this case, inorganic oxide nanoparticles can be easily stuck in the surface of the material, thereby easily forming a structure comprising the stuck inorganic oxide nanoparticles that are connected to each other. After passing the step of removing the inorganic oxide nanoparticles which are stuck in the surface of the material capable of doping and dedoping lithium modified with organic functional group as explained below, nanopores regularly ordered on the carbon layer form so as to correspond to the inorganic oxide nanoparticles to make a three-dimensional porous structure.

Meanwhile, after the mixing step, the mixture of the material capable of doping and dedoping lithium modified with organic functional group and the inorganic oxides are heated.

After heating, in the material capable of doping and dedoping lithium modified with organic functional group, organic functional groups are decomposed thus leaving only carbon, thereby forming a carbon layer on the surface of the material capable of doping and dedoping lithium. The inorganic oxide particle may be stuck in the carbon layer. The formed carbon layer can inhibit direct reaction of the material capable of doping and dedoping lithium with the inorganic oxides, enabling high temperature heating. And, in the subsequent step of removing inorganic oxides, the carbon layer can make the material capable of doping and dedoping lithium not to be easily dissolved in an acidic or basic aqueous solution.

The heating can be conducted at about 700 to 1200° C., specifically about 700 to 850° C., about 900 to 1100° C., or about 1000 to 1200° C. If the heating temperature is in the above range, degree of crystallinity of the carbon layer is excellent thus facilitating lithium intercalation/deintercalation, and reaction of the material capable of doping and dedoping lithium with carbon layer can be inhibited. For example, if the material capable of doping and dedoping lithium is silicon, the silicon can be prevented from reacting with a carbon layer to form a non-conductor SiC in the above range of the heating temperature.

The heating can be conducted under vacuum or inert atmosphere, and in this case, side reactions can be prevented. The inert atmosphere may be argon or nitrogen atmosphere, but not limited thereto.

Subsequently, the inorganic oxides are removed. Thereby, the inorganic oxide nanoparticles which are stuck in the carbon layer formed on the surface of a core comprising material capable of doping and dedoping lithium and connected to each other can be removed. If the inorganic oxide nanoparticles are removed, multiple nanopores regularly ordered on the carbon layer with pore wall having uniform thickness placed therebetween can be formed.

The process of removing inorganic oxides can be conducted by adding basic material such as sodium hydroxide, potassium hydroxide, etc. or acidic material such as HF, etc. to the heated product. This process can be conducted for an appropriate time to remove the inorganic oxides, for example, 2 to 3 hours.

Thereby, negative-electrode active material for rechargeable lithium battery according to one embodiment of the invention can be prepared.

The negative-electrode active material for rechargeable lithium battery can be used for negative electrode of electrochemical cell such as rechargeable lithium battery. The rechargeable lithium battery comprises a positive electrode comprising positive-electrode active material and electrolyte, as well as the negative electrode.

The rechargeable lithium battery may show about 94% or more of coulombic efficiency after conducting 30 cycles or more of charge and discharge. The negative electrode can be prepared by mixing negative-electrode active material for rechargeable lithium battery, conductor, binder and solvent to prepare a negative-electrode active material composition, and then, directly coating it on a copper current collector and drying it. Alternatively, it can be prepared by casting the negative-electrode active material composition on a separate support, and then laminating a film delaminated from the support on an aluminum current collector.

As the conductor, carbon black, graphite, or metal powder can be used, as the binder, vinylidene fluoride/hexafluoropropylene copolymer, polyvinylidenefluoride, polyacrylonitrile, polymethylmethacrylate, polytetrafluoroethylene and a mixture thereof can be used, but not limited thereto. As the solvent, N-methylpyrrolidone, aceton, tetrahydrofuran, decane, etc. can be used, but not limited thereto. The negative-electrode active material, conductor, binder and the solvent can be used in an amount commonly used in rechargeable lithium battery.

The positive electrode can also be prepared by mixing positive-electrode active material, binder and solvent to prepare an positive-electrode active material composition, and then, directly coating it on an aluminum current collector, or casting on a separate support and laminating a positive-electrode active material film delaminated from the support on a copper current collector. The positive-electrode active material composition, if necessary, may further comprise conductor.

As the positive-electrode active material, materials capable of intercalation/deintercalation of lithium are used, and for examples, metal oxide, lithium complex metal oxide, lithium complex metal sulfide, and lithium complex metal nitride, etc. can be used, but not limited thereto.

As the separator, those commonly used in rechargeable lithium battery can be used, and for examples, polyethylene, polypropylene, polyvinylidene fluoride or a multilayer thereof can be used, or mixed multilayer such as polyethylene/polypropylene two-layer separator, polyethylene/polypropylene/polyethylene three-layer separator, polypropylene/polyethylene/polypropylene three-layer separator, etc. can be used.

As the electrolyte filled in the rechargeable lithium battery, non-aqueous electrolyte or known solid electrolyte can be used, and an electrolyte comprising lithium salt dissolved therein can be used.

As solvent for the non-aqueous electrolyte, cyclic carbonate such as ethyelencarbonate, diethylenecarbonate, propylenecarbonate, butylenecarbonate, vinylenecarbonate, etc., chain carbonate such as dimethylcarbonate, methylethylcarbonate, diethylcarbonate, etc., ester such as methylacetate, ethylacetate, propylacetate, methylpropionate, ethylpropionate, γ-butyrolactone, etc., ether such as 1,2-dimethoxyethane, 1,2-diethoxyethane, tetrahydrofuran, 1,2-dioxane, 2-methyltetrahydrofuran, etc., nitrile such as acetonitrile, etc., amide such as dimethylformamide, etc. can be used, but not limited thereto. They can be used alone or in combinations. Especially, a mixed solvent of cyclic carbonate and chain carbonate can be used.

And, as the electrolyte, gel polymer electrolyte obtained by impregnating polymer electrolyte such as polyethyleneoxide, polyacrylonitrile, etc., with an electrolyte solution, or inorganic solid electrolyte such as LiI, $Li_3N$, etc. can be used, but not limited thereto.

The lithium salt can be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlO_2$, $LiAlCl_4$, LiCl and LiI, but not limited thereto.

EXAMPLES

The present invention will be explained in more detail with reference to the following examples. However, these examples are only to illustrate the invention and the scope of the invention is not limited thereto.

Example 1

Preparation of Butyl-Modified Silicon

After completely mixing 30 g of $SiCl_4$ (purity 99.999%, Aldrich Company) and 100 g of 1,2-dimethoxyethane, the mixed solution was decanted with sodium naphthalide solution, and refluxed at 400° C. for 1 hour. The obtained solution was mixed with 40 Ml of Grignard reagent n-butyllithium, and agitated overnight. At this time, the Grignard reagent n-butyllithium was reacted with $SiCl_4$ to form butyl-modified silicon. The solvent and naphthalene were removed by heating to 120° C. at vacuum using a rotary evaporator, and by-products of NaCl and LiCl were removed using excessive amount of n-hexane and water. Finally, butyl-modified silicon was obtained as light yellow viscous gel.

Preparation of Negative-Electrode Active Material for Rechargeable Lithium Battery The above prepared butyl-modified silicon in gel form was mixed with spherical silica nanoparticles having average particle diameter of about 200 nm. The above prepared butyl-modified silicon and the spherical silica nanoparticles were mixed at a weight ratio of 70:30 (butyl-modified silicon:spherical silica nanoparticles).

The obtained mixture was heated at 900° C. for 3 hours under Ar stream.

The heated product was immersed in 1M HF solution for 2 hours.

Thereby, negative-electrode active material for rechargeable lithium battery which comprises a core comprising silicon and a carbon layer having three-dimensional porous structure comprising nanopores formed on the core surface was prepared. The average diameter of the nanopores was about 200 nm, the thickness of pore wall was about 40 nm, and the thickness of the carbon layer was about 10 nm. The average diameter of crystalline grain of silicon in the core was about 40 nm. And, the specific surface area of the negative-electrode active material for rechargeable lithium battery was about 158 $m^2/g$.

Example 2

Preparation of Negative-Electrode Active Material for Rechargeable Lithium Battery Butyl-modified silicon prepared by the same method as Example 1 and spherical silica nanoparticles having particle diameter of about 200 nm were mixed at a weight ratio of 70:30 (butyl-modified silicon:spherical silica nanoparticles).

The obtained mixture was heated at 900° C. for 3 hours under Ar stream.

The heated product was immersed in 1M HF solution for 3 hours.

Thereby, negative-electrode active material for rechargeable lithium battery which comprises a core comprising silicon and a carbon layer having three-dimensional porous structure comprising nanopores formed on the core surface was prepared. The average diameter of the nanopores was about 100 nm, the thickness of pore wall was about 60 nm, and the thickness of the carbon layer was about 10 nm. The average diameter of crystalline grain of silicon in the core was about 40 nm. And, the specific surface area of the negative-electrode active material for rechargeable lithium battery was about 149 $m^2/g$.

Example 3

Preparation of Negative-Electrode Active Material for Rechargeable Lithium Battery Butyl-modified silicon prepared by the same method as Example 1 and spherical silica nanoparticles having particle diameter of about 200 nm were mixed at a weight ratio of 70:30 (butyl-modified silicon:spherical silica nanoparticles).

The obtained mixture was heated at 1000° C. for 3 hours under Ar stream.

The heated product was immersed in 1M HF solution for 2 hours.

Thereby, negative-electrode active material for rechargeable lithium battery which comprises a core comprising silicon and a carbon layer having three-dimensional porous structure comprising nanopores formed on the core surface was prepared. The average diameter of the nanopores was about 150 nm, the thickness of pore wall was about 100 nm, and the thickness of the carbon layer was about 10 nm. The average diameter of crystalline grain of silicon in the core was about 60 nm. And, the specific surface area of the negative-electrode active material for rechargeable lithium battery was about 150 $m^2/g$.

Example 4

Preparation of Negative-Electrode Active Material for Rechargeable Lithium Battery Butyl-modified silicon prepared by the same method as Example 1 and spherical silica nanoparticles having particle diameter of about 300 nm were mixed at a weight ratio of 70:30 (butyl-modified silicon:spherical silica nanoparticles).

The obtained mixture was heated at 900° C. for 3 hours under Ar stream.

The heated product was immersed in 1M HF solution for 2 hours.

Thereby, negative-electrode active material for rechargeable lithium battery which comprises a core comprising silicon and a carbon layer having three-dimensional porous structure comprising nanopores formed on the core surface was prepared. The average diameter of the nanopores was about 250 nm, the thickness of pore wall was about 120 nm, and the thickness of the carbon layer was about 10 nm. The average diameter of crystalline grain of silicon in the core was about 60 nm. And, the specific surface area of the negative-electrode active material for rechargeable lithium battery was about 150 m$^2$/g.

Example 5

Preparation of Negative-Electrode Active Material for Rechargeable Lithium Battery Butyl-modified silicon prepared by the same method as Example 1 and spherical silica nanoparticles having particle diameter of about 300 nm were mixed at a weight ratio of 70:30 (butyl-modified silicon:spherical silica nanoparticles).

The obtained mixture was heated at 1000° C. for 3 hours under Ar stream.

The heated product was immersed in 1M HF solution for 2 hours.

Thereby, negative-electrode active material for rechargeable lithium battery which comprises a core comprising silicon and a carbon layer having three-dimensional porous structure comprising nanopores formed on the core surface was prepared. The average diameter of the nanopores was about 300 nm, the thickness of pore wall was about 150 nm, and the thickness of the carbon layer was about 10 nm. The average diameter of crystalline grain of silicon in the core was about 60 nm. And, the specific surface area of the negative-electrode active material for rechargeable lithium battery was about 150 m$^2$/g.

Reference Example 1

Preparation of Negative-Electrode Active Material for Rechargeable Lithium Battery Butyl-modified silicon prepared by the same method as Example 1 and spherical silica nanoparticles having particle diameter of about 200 nm were mixed at a weight ratio of 70:30 (butyl-modified silicon:spherical silica nanoparticles).

The obtained mixture was heated at 900° C. for 5 hours under Ar stream.

The heated product was immersed in 1M HF solution for 2 hours.

Thereby, negative-electrode active material for rechargeable lithium battery which comprises a core comprising silicon and a carbon layer having three-dimensional porous structure comprising nanopores formed on the core surface was prepared. The average diameter of the nanopores was about 300 nm, the thickness of pore wall was about 170 nm, and the thickness of the carbon layer was about 15 nm. The average diameter of crystalline grain of silicon in the core was about 100 nm. And, the specific surface area of the negative-electrode active material for rechargeable lithium battery was about 100 m$^2$/g.

Reference Example 2

Preparation of Negative-Electrode Active Material for Rechargeable Lithium Battery Butyl-modified silicon prepared by the same method as Example 1 and spherical silica nanoparticles having particle diameter of about 200 nm were mixed at a weight ratio of 70:30 (butyl-modified silicon:spherical silica nanoparticles).

The obtained mixture was heated at 1000° C. for 5 hours under Ar stream.

The heated product was immersed in 1M HF solution for 2 hours.

Thereby, negative-electrode active material for rechargeable lithium battery which comprises a core comprising silicon and a carbon layer having three-dimensional porous structure comprising nanopores formed on the core surface was prepared. The average diameter of the nanopores was about 80 nm, the thickness of pore wall was about 140 nm, and the thickness of the carbon layer was about 15 nm. The average diameter of crystalline grain of silicon in the core was about 80 nm. And, the specific surface area of the negative-electrode active material for rechargeable lithium battery was about 100 m$^2$/g.

Comparative Example 1

Ball milling was conducted using silicon powder (Sigma Aldrich Co., 20 micron) and natural graphite at a speed of 800 rpm for 8 hours, thereby preparing carbon-coated silicon particles, which was used as negative-electrode active material for rechargeable lithium battery. The weight ratio of carbon and silicon in the carbon-coated silicon particle was 44:56.

Comparative Example 2

$Si_{0.7}B_{0.3}$ metallic solid solution powder (BET specific surface area 16 m$^2$/g, average particle diameter 0.2 micron), carbon fiber (BET specific surface area 35 m$^2$/g, average length: 2 micron, average diameter 0.08 micron) and 10 g of polyvinylpyrrolidone were mixed in 1 l of ethanol, and further mixed by wet jet mill to obtain a slurry. The total weight of $Si_{0.7}B_{0.3}$ metallic solid solution powder and carbon fiber (CF) used for preparation of the slurry were 100 g, and the weight ratio was 70:30. Then, spray drying (at an ambient temperature of 2000° C.) was applied for the slurry to form a composite particles. The average particle diameter of the composite particles was 10 μm.

Subsequently, 10 g of the composite particles were heated to about 1000° C. in a boiling reactor, and the heated particles were contacted with a mixed gas of 25° C. consisting of benzene and nitrogen gas, and CVD treated at 1000° C. for 60 minutes. As result, carbon material generated by thermal decomposition of the mixed gas was deposited on the composite particle to prepare negative-electrode active material.

The structure of the negative-electrode active material was confirmed by SEM photograph as shown in FIG. 1. Referring to FIG. 1, it was confirmed that although the negative-electrode active material of Comparative Example 2 comprises a core consisting of the composite particles and a carbon deposited layer on the core, nanopores were not formed on the carbon deposited layer.

XPS(X-Ray Photoelectron Spectroscopy)

Figure 2:
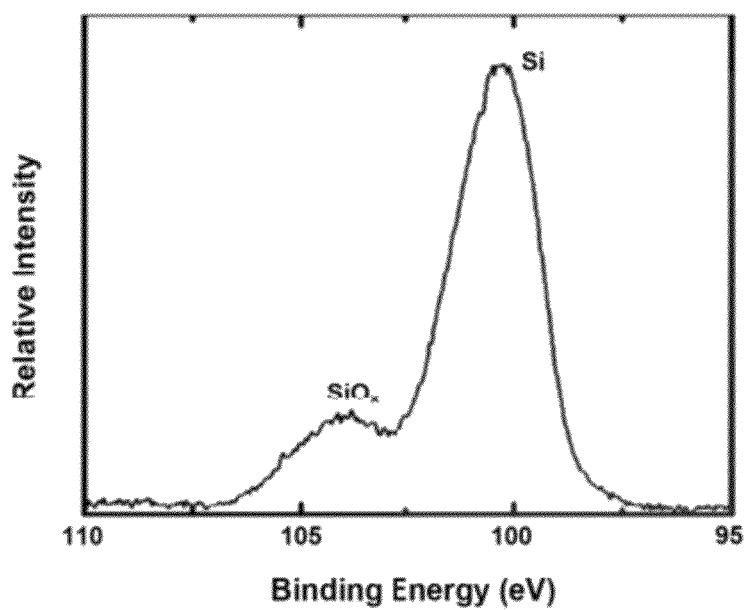
FIG. 2 is XPS graph of negative-electrode active material for rechargeable lithium battery of Example 1.

The negative-electrode active material for rechargeable lithium battery prepared in Example 1 was analyzed with X-ray photoelectron spectroscopy. The result was shown in FIG. 2. For silica, X-ray photoelectron spectroscopy shows two predominant peaks at about 110 eV and about 105 eV. However, in FIG. 2, the about 110 eV and about 105 eV peaks were not observed, but weak peak at about 104 eV indicating $SiO_x$ (0<x<2) and strong peak at about 100 eV indicating Si were observed. Thus, it was confirmed that all the silica particles on the surface of carbon layer were removed in the negative-electrode active material of Example 1. The strong peak at about 100 eV indicates silicon comprised in the core, and the weak peak at about 104 eV indicates that some of $SiO_x$(0<x<2) exists in the core.

SEM Photograph

Figure 3A:
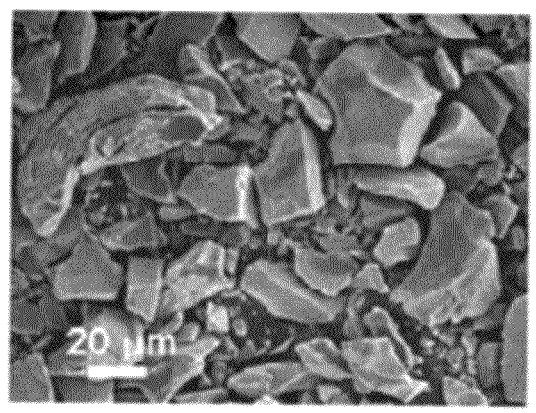
FIG. 3a is SEM photograph of composite comprising silica nanoparticles that are stuck in a carbon layer formed on the surface of a core comprising silicon, immediately after heating in the process of Example 1.
Figure 3B:
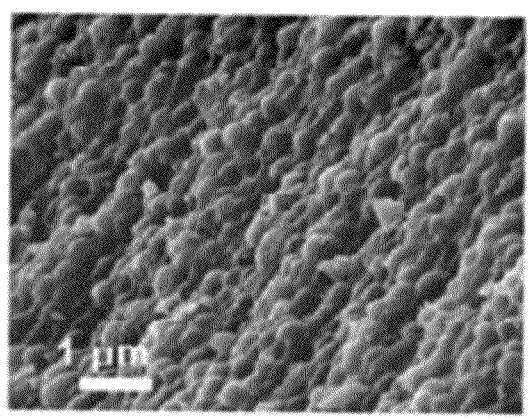
Figure 3C:
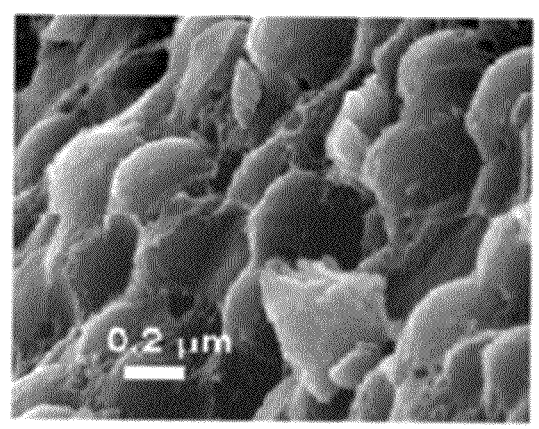

Immediately after heating in Example 1, SEM photographs of the composite comprising silica nanoparticles that are stuck in the carbon layer formed on the surface of the core comprising silicon were taken, and the results were shown in FIGS. 3a to 3c. FIGS. 3a to 3c show that silica nanoparticles are stuck in the surface of the carbon layer with connected to each other.

Figure 4A:
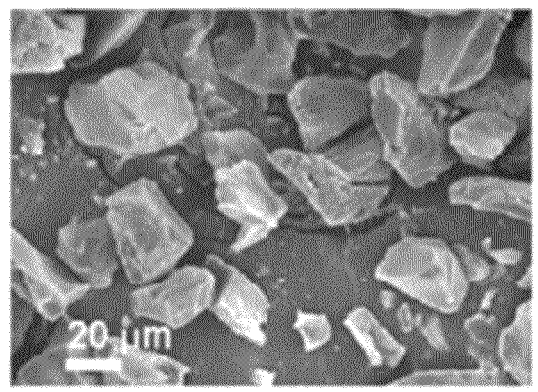
FIG. 4a is SEM photograph of negative-electrode active material for rechargeable lithium battery of Example 1.
Figure 4B:
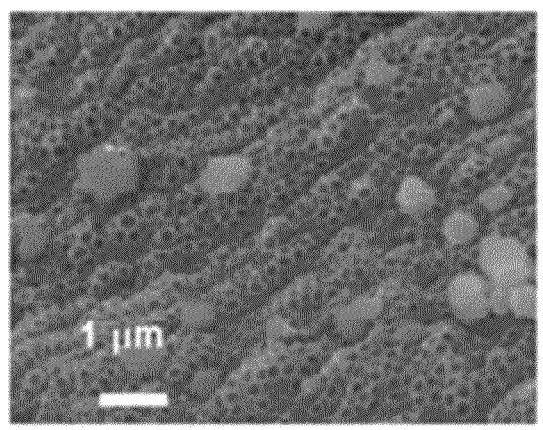
Figure 4C:
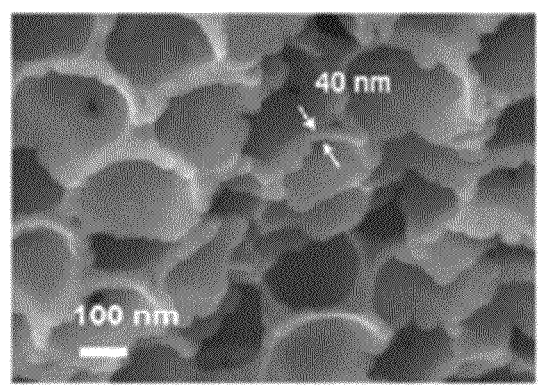
FIG. 4c is SEM photograph of the cross section of negative-electrode active material for rechargeable lithium battery of Example 1.

For the negative-electrode active material for rechargeable lithium battery of which silica nanoparticles connected to each other were removed in Example 1, SEM photographs were taken, and the results were shown in FIGS. 4a to 4c. FIGS. 4a to 4c show that silica nanoparticles stuck in the surface of the carbon layer with connected to each other were removed to produce negative-electrode active material for rechargeable lithium battery having nanopores regularly formed and ordered. The average diameter of the negative-electrode active material for rechargeable lithium battery was about 200 nm, and the thickness of pore wall was about 40 nm.

After 100 cycles of charge/discharge, SEM photographs of the negative material for rechargeable lithium battery of Example 1 were taken. The results were shown in FIGS. 5a and 5b.

Figure 5A:
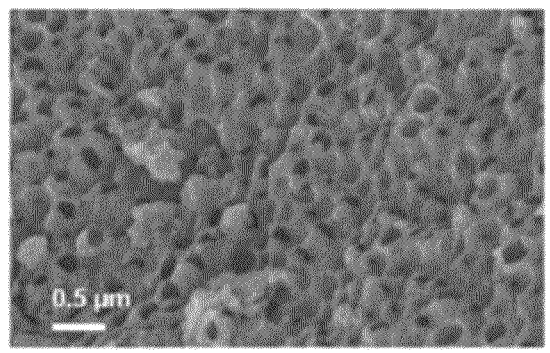
FIG. 5a is SEM photograph of negative-electrode active material for rechargeable lithium battery of Example 1, after conducting 100 cycles of charge/discharge.
Figure 5B:
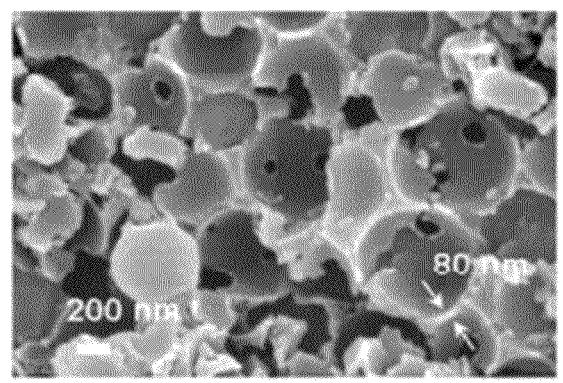

FIGS. 5a and 5b show that average diameter of nanopores of the negative-electrode active material for rechargeable lithium battery was changed to about 150 nm, and the thickness of pore wall was changed to about 80 nm.

TEM Photograph and SADP

The negative-electrode active material for rechargeable lithium battery prepared in Example 1 was deposited to carbon-coated copper grid to prepare a sample, and TEM photograph of the cross-section was taken. The result was shown in FIG. 6a. And, the result of SADP (selected area diffraction pattern) was shown in FIG. 6b.

Figure 6A:
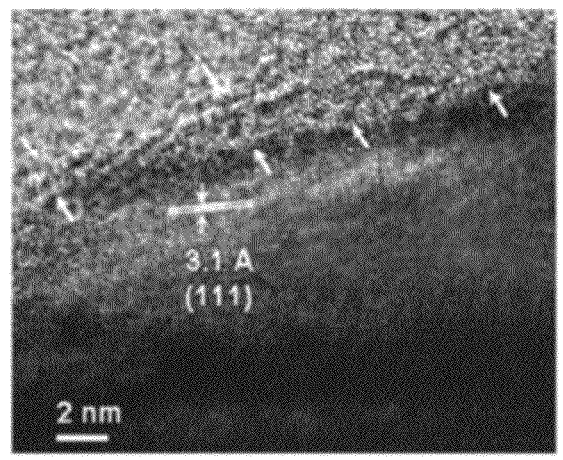
FIG. 6a is TEM photograph of the cross section of negative-electrode active material for rechargeable lithium battery of Example 1.

In FIG. 6a, lattice fringe (111) appears. As shown in FIG. 6a, very thin disordered carbon layer was observed on the surface of the negative-electrode active material for rechargeable lithium battery. And, as result of CHS (carbon, hydrogen, sulfur) analysis, carbon content was 12 wt % in the negative-electrode active material for rechargeable lithium battery.

Figure 6B:
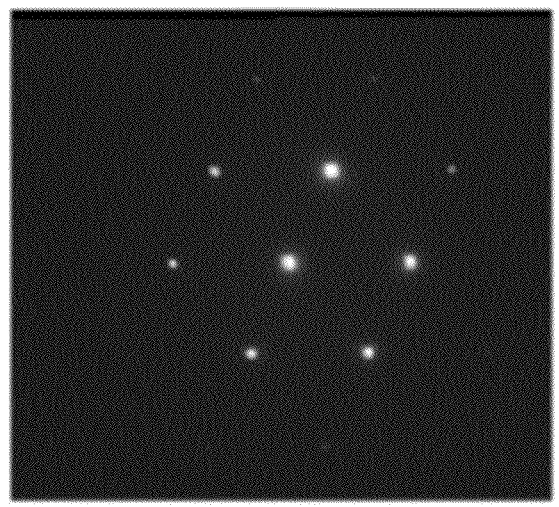
FIG. 6b is SADP photograph of negative-electrode active material for rechargeable lithium battery of Example 1.

The SADP result of FIG. 6b shows the formation of diamond cubic Si phase.

Figure 7A:
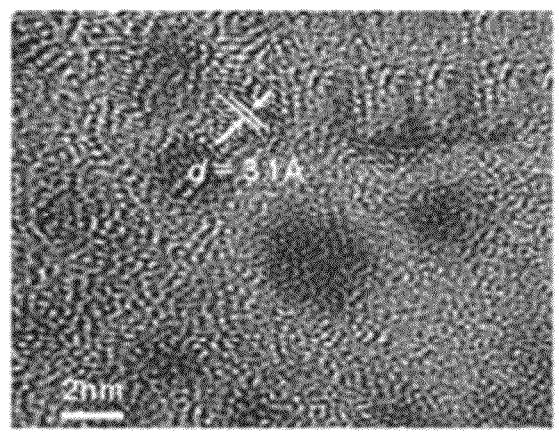
FIG. 7a is TEM photograph of negative-electrode active material for rechargeable lithium battery of Example 1, after conducting 100 cycles of charge/discharge.
Figure 7B:
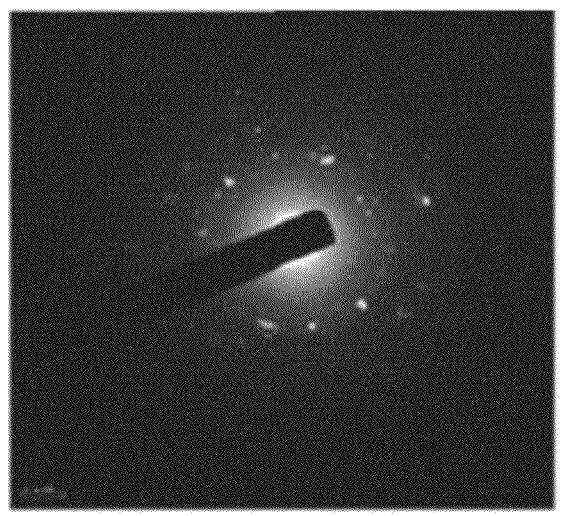
FIG. 7 is SADP photograph of negative-electrode active material for rechargeable lithium battery of Example 1, after conducting 100 cycles of charge/discharge.

After 100 cycles of charge/discharge, TEM photograph of the negative-electrode active material for rechargeable lithium battery was taken, and the result was shown in FIG. 7a. And, the result of SADP was shown in FIG. 7b.

Raman Spectrum Analysis

In order to examine ordering of the carbon layer formed on the surface of the core in Example 1, SERS (surface enhanced Raman spectra) of the negative-electrode active material for rechargeable lithium battery were analyzed. Raman spectrum analysis was conducted using Renishaw 2000 Raman microscope system and 632.8 nm laser excitation. And, in order to avoid laser heat effect, analysis was conducted at low laser output and exposure time of 30 seconds using 50-fold optical lens. The result was shown in FIG. 8.

Peak mode at about 158 cm$^{-1}$ corresponding to G-mode is due to in-plane displacement of carbon strongly coupled to hexagonal sheet, and it means ordered layer. If disorder is introduced in carbon material, band appearing in Raman spectrum becomes broad, and disorder-induced band or D-mode band is generated around about 1360 cm$^{-1}$. Raman integrated intensity ratio D/G (I(1360)/I(1580)) indicates the degree of carbonization, and the lower intensity ratio indicates the higher degree of carbonization.

Figure 8:
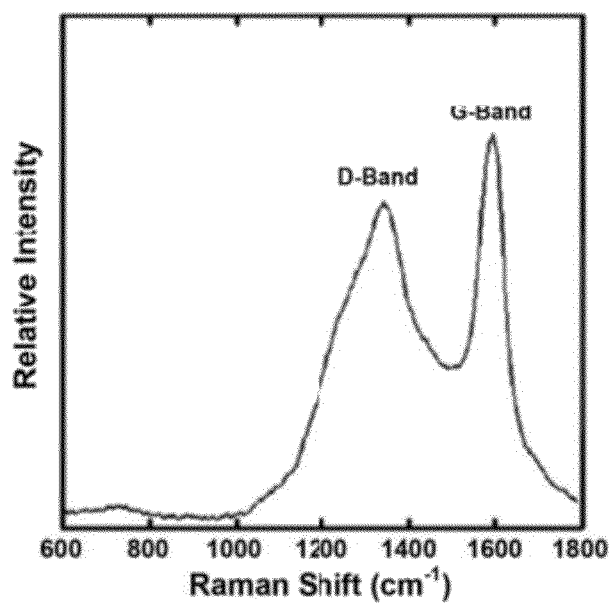
FIG. 8 shows Raman spectrum of negative-electrode active material for rechargeable lithium battery of Example 1.

As shown in FIG. 8, D/G (I(1360)/I(1580)) of the carbon layer of the negative-electrode active material for rechargeable lithium battery of Example 1 is about 1.51, which is much larger than 0.09 for ordered graphite, indicating that disordered carbon layer forms.

X-Ray Diffraction (XRD) Analysis

For the negative-electrode active material for rechargeable lithium battery prepared in Example 1, X-ray diffraction analysis was conducted. The result was shown in FIG. 9.

And, after conducting 100 cycles of charge/discharge for the negative-electrode active material for rechargeable lithium battery prepared in Example 1, X-ray diffraction analysis was conducted. The result was shown in FIG. 10.

In this analysis, Cu—Kα ray was used as a light source.

Figure 9:
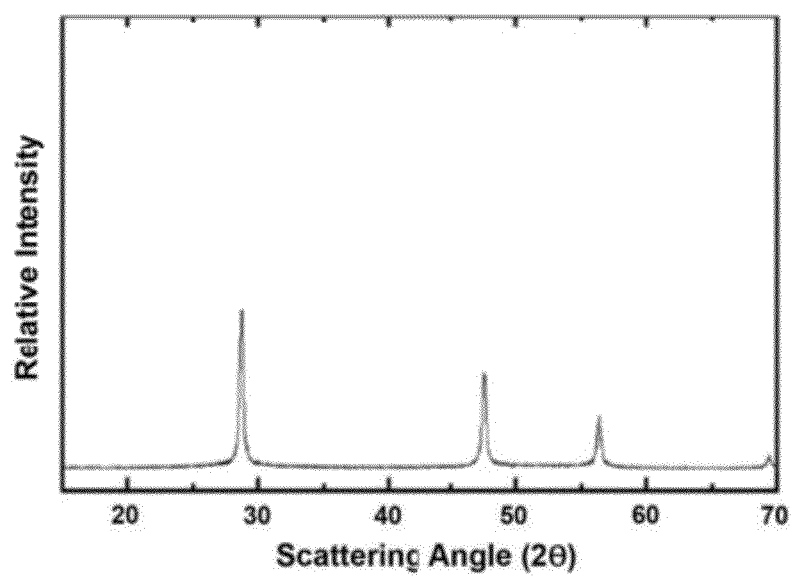
FIG. 9 is X-ray diffraction graph of negative-electrode active material for rechargeable lithium battery of Example 1.
Figure 10:
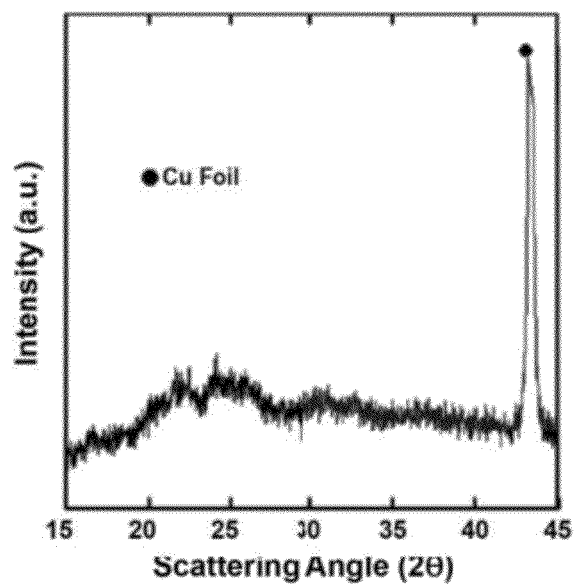
FIG. 10 is X-ray diffraction graph of negative-electrode active material for rechargeable lithium battery of Example 1, after conducting 100 cycles of charge/discharge.

As shown in FIGS. 9 and 10, in the negative-electrode active material for rechargeable lithium battery of Example 1, initially crystalline silicon phase was change to amorphous silicon phase.

BET Specific Surface Area

Figure 11:
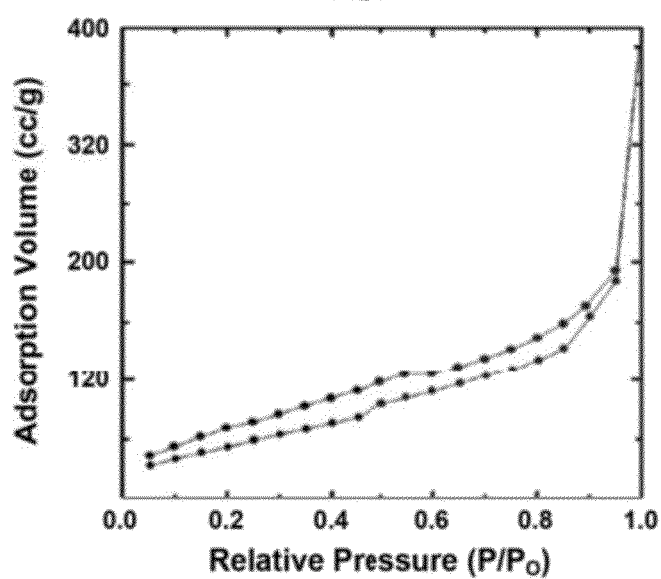
FIG. 11 is graph showing the result of isothermal adsorption experiment of negative-electrode active material for rechargeable lithium battery of Example 1.
Figure 12A:
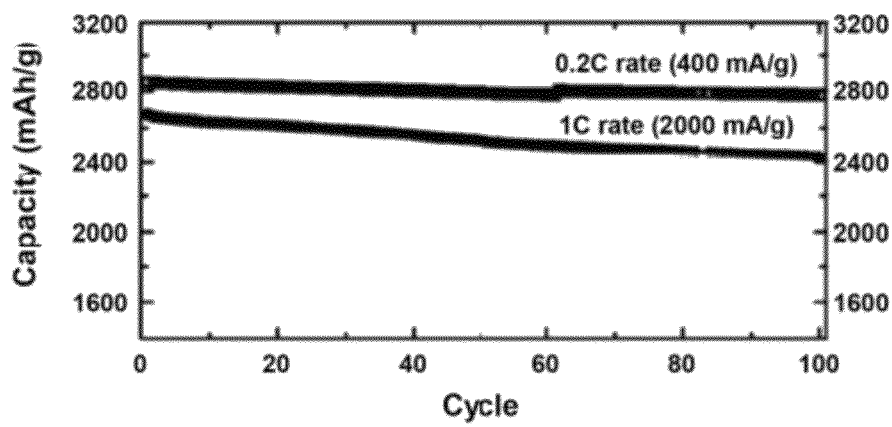
FIGS. 12a-12i are graphs respectively showing cycle number vs charge capacity and Coulombic efficiency of coin-type half cells of Examples 6-10, Reference Examples 3 and 4, and Comparative Examples 3 and 4 prepared using negative-electrode active materials for rechargeable lithium battery of Examples 1-5, Reference Examples 1 and 2, and Comparative Examples 1 and 2.
Figure 12B:
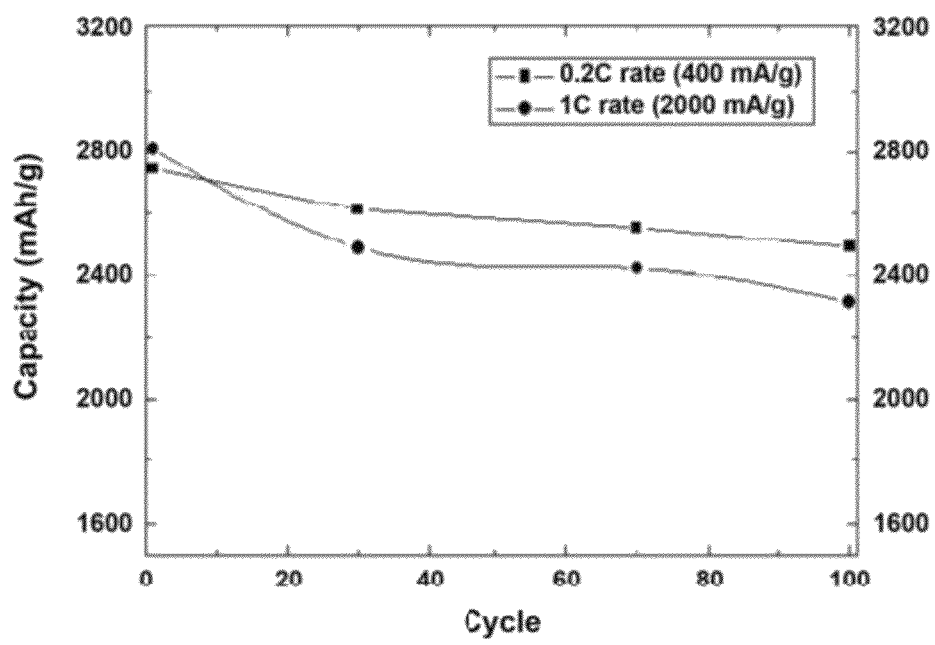
Figure 12C:
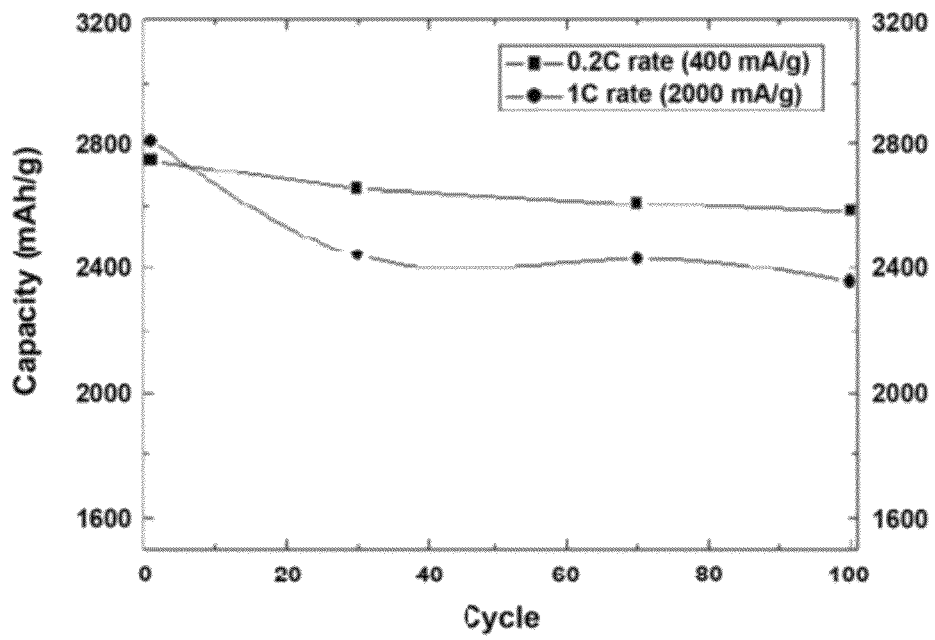
Figure 12D:
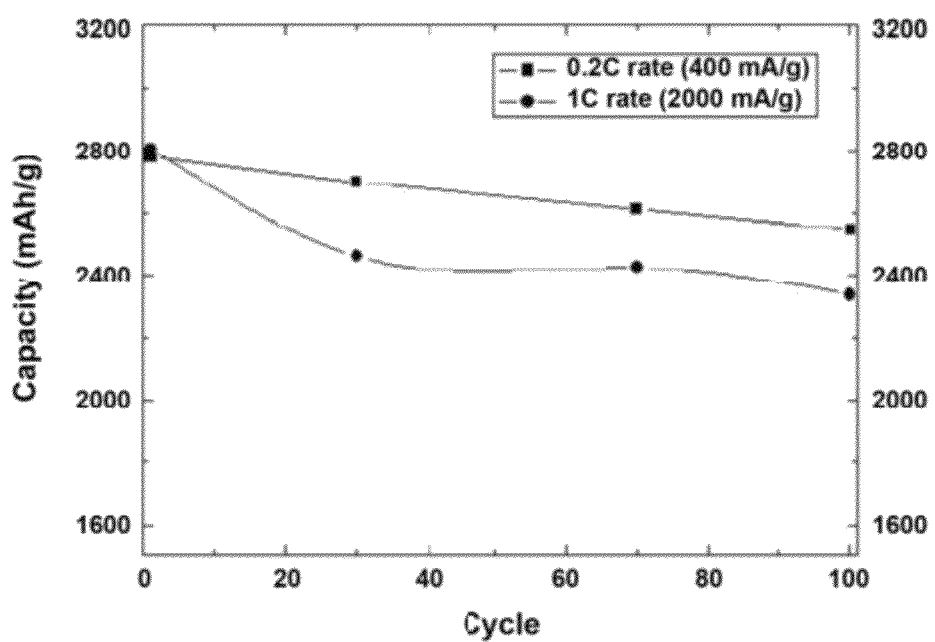
Figure 12E:
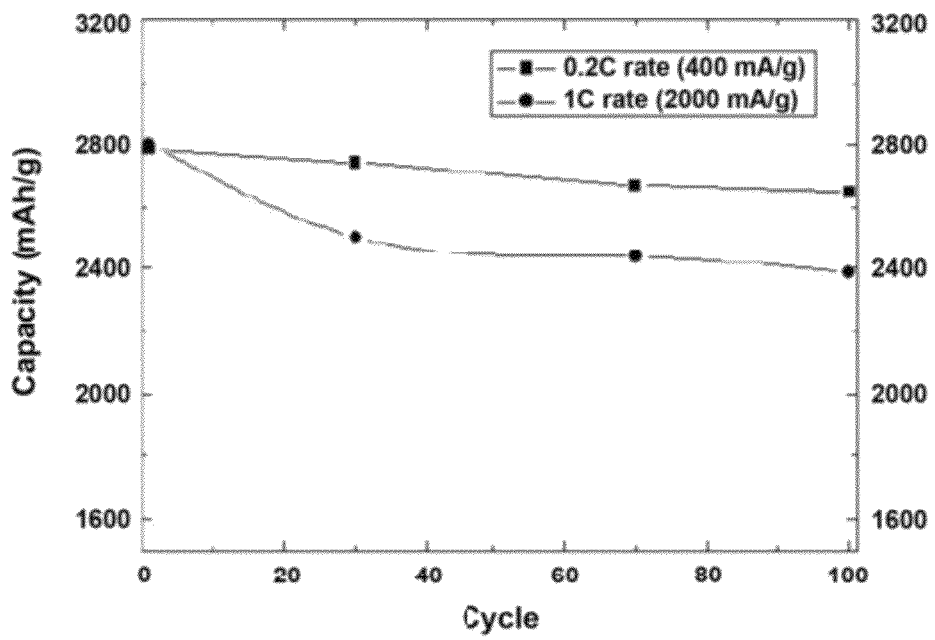
Figure 12F:
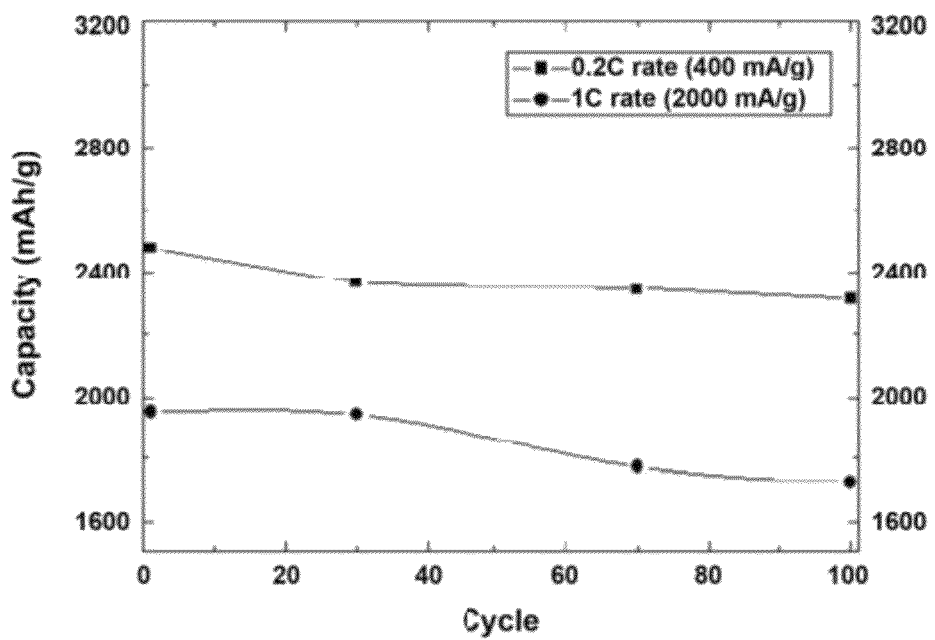
Figure 12G:
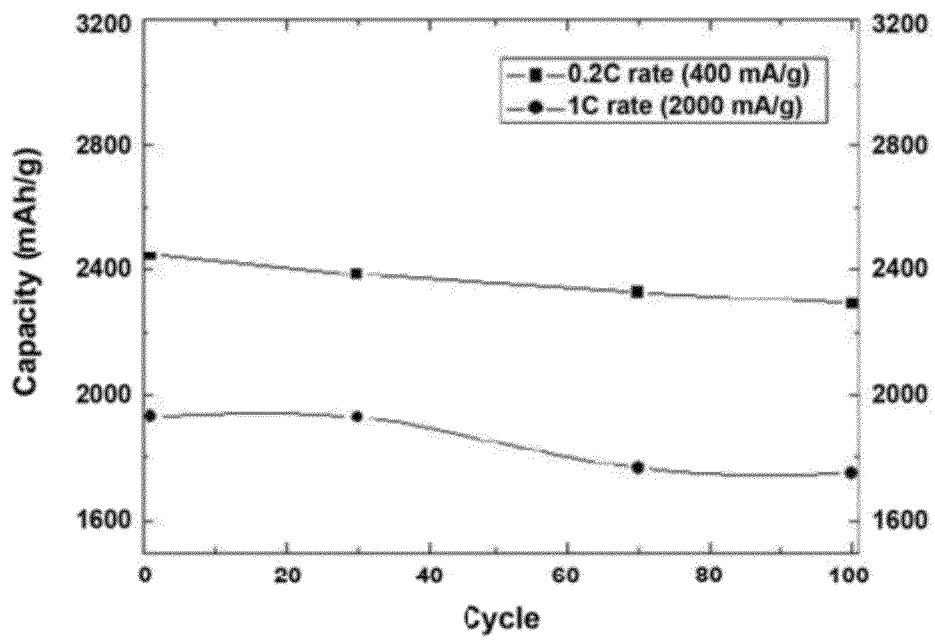
Figure 12H:
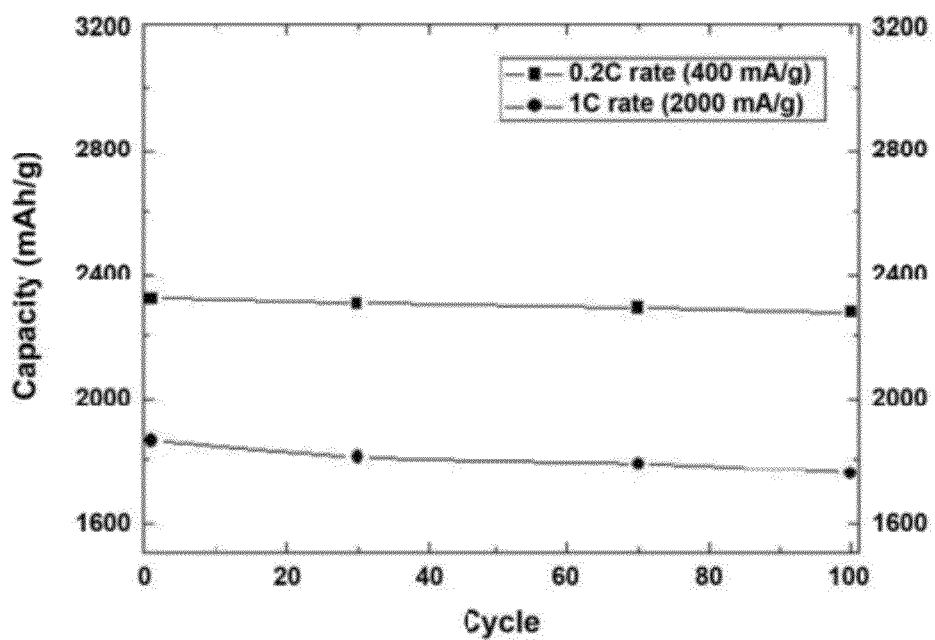
Figure 12I:
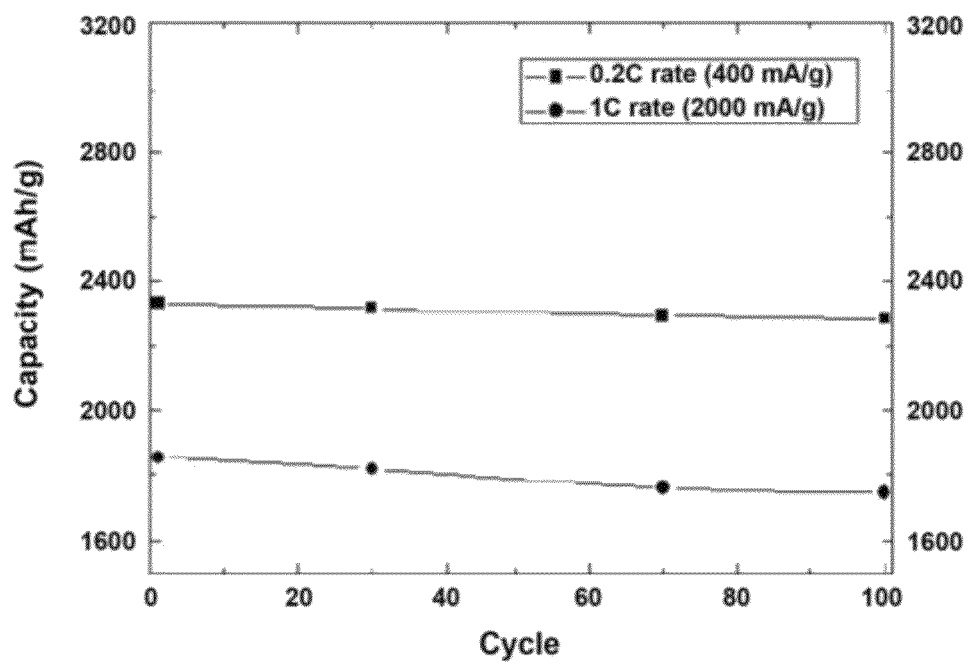

In order to examine surface area of the negative-electrode active material for rechargeable lithium battery prepared in Example 1, nitrogen isothermal adsorption experiment was conducted with Micrometrics ASAP 2020 system, and the result was shown in FIG. 11. In FIG. 11, the lower line is adsorption curve of nitrogen gas, and the upper line is desorption curve of nitrogen gas.

The surface area of the negative-electrode active material for rechargeable lithium battery of Example 1 was about 158M$^2$/g, as calculated using the results shown in FIG. 11 and BET (Brunauer-Emmett-Teller) equation.

Examples 6-10

The negative-electrode active materials for rechargeable lithium battery prepared in Examples 1-5, Super P carbon black and poly(vinylidene fluoride) binder were mixed in N-methylpyrrolidone solvent at a weight ratio of 80:10:10 to prepare negative-electrode active material slurry. The prepared negative-electrode active material slurry was coated on a copper foil of 50 μm thickness, and dried at 150° C. for 20 minutes, and then, roll-pressed to prepare a negative electrode.

Using the above prepared negative electrode, lithium counter electrode, microporous polyethylene separator and electrolyte, coin type half cell (2016 R-type) was prepared in a helium-filled glove box. The half cells prepared using the negative-electrode active materials of Examples 1-5 were respectively designated as Examples 6-10. In these half cells, electrolyte obtained by dissolving 1.05M LiPF$_6$ in a mixed solvent of ethylene carbonate, diethylene carbonate and ethyl-methyl carbonate at a volume ratio of 30:30:40 was used.

Reference Examples 3-4

Half cells of Reference Examples 3~4 were prepared by the same method as Examples 6-10, except that the negative-electrode active materials for rechargeable lithium battery prepared in Reference Examples 1-2 were used.

Comparative Examples 3-4

Half cells of Comparative Examples 3-4 were prepared by the same method as Examples 6-10, except that the negative-electrode active materials for rechargeable lithium battery prepared in Comparative Examples 1-2 were used.

Charge/Discharge Properties and Coulombic Efficiency

For the half cells prepared in Examples 6-10, Reference Examples 3, 4, and Comparative Examples 3 and 4, 100 cycles of charge/discharge were conducted at 1.5 to 0V, 0.2 C (400 mA/g) to measure charge/discharge properties at 1, 30, 70 and 100 cycle. The results were shown in Table 1

TABLE 1

| Example | Cycle number (time) | Discharge capacity (mAh/g) | Charge capacity (mAh/g) | Coulombic efficiency (%) | Irreversible capacity (%) |
|---|---|---|---|---|---|
| Example 6 | 1 | 3212 | 2774 | 86 | 14 |
|  | 30 | 2787 | 2760 | 99 | 1 |
|  | 70 | 2777 | 2722 | 98 | 1 |
|  | 100 | 2684 | 2657 | 99 | 1 |
| Example 7 | 1 | 3124 | 2747 | 87 | 13 |
|  | 30 | 2767 | 2613 | 94 | 6 |
|  | 70 | 2697 | 2554 | 94 | 6 |
|  | 100 | 2581 | 2494 | 96 | 4 |
| Example 8 | 1 | 3120 | 2746 | 88 | 12 |
|  | 30 | 2714 | 2657 | 97 | 3 |
|  | 70 | 2698 | 2611 | 96 | 4 |
|  | 100 | 2617 | 2587 | 98 | 2 |
| Example 9 | 1 | 3117 | 2776 | 89 | 11 |
|  | 30 | 2741 | 2698 | 98 | 2 |
|  | 70 | 2699 | 2614 | 96 | 4 |
|  | 100 | 2597 | 2550 | 98 | 2 |
| Example 10 | 1 | 3110 | 2781 | 89 | 11 |
|  | 30 | 2787 | 2740 | 98 | 2 |
|  | 70 | 2711 | 2670 | 98 | 2 |
|  | 100 | 2654 | 2650 | 99 | 1 |

TABLE 2

| Reference example | Cycle number (time) | Discharge capacity (mAh/g) | Charge capacity (mAh/g) | Coulombic efficiency (%) | Irreversible capacity (%) |
|---|---|---|---|---|---|
| Reference example 3 | 1 | 2775 | 2478 | 89 | 11 |
|  | 30 | 2765 | 2365 | 85 | 15 |
|  | 70 | 2536 | 2342 | 92 | 8 |
|  | 100 | 2465 | 2312 | 93 | 7 |
| Reference example 4 | 1 | 2764 | 2445 | 88 | 12 |
|  | 30 | 2759 | 2386 | 86 | 14 |
|  | 70 | 2522 | 2332 | 92 | 8 |
|  | 100 | 2498 | 2296 | 91 | 9 |

TABLE 3

| Comparativee example | Cycle number (time) | Discharge capacity (mAh/g) | Charge capacity (mAh/g) | Coulombic efficiency (%) | Irreversible capacity (%) |
|---|---|---|---|---|---|
| Comparative example 3 | 1 | 2658 | 2335 | 87 | 13 |
|  | 30 | 2586 | 2320 | 89 | 11 |
|  | 70 | 2555 | 2299 | 89 | 11 |
|  | 100 | 2512 | 2286 | 91 | 9 |
| Comparative example 4 | 1 | 2648 | 2317 | 87 | 13 |
|  | 30 | 2596 | 2303 | 88 | 12 |
|  | 70 | 2516 | 2289 | 90 | 10 |
|  | 100 | 2493 | 2275 | 91 | 9 |

From the Tables 1 to 3, it was confirmed that the half cells of Examples 6 to 10 comprising the negative-electrode active materials of Examples 1 to 5 exhibit excellent charge/discharge capacity (charge/discharge properties) and Coulombic efficiency compared to the half cells of Reference Examples 3 and 4 and Comparative Examples 3 and 4, and such excellent charge/discharge properties and Coulombic efficiency maintained almost unchanged even after 100 cycles of charge/discharge.

Cycle Life Property

For the half cells prepared in Examples 6~10, Reference Examples 3 and 4, and Comparative Examples 3 and 4, 100 cycles of charge/discharge were conducted at 1.5 to 0V, respectively at 0.2 C (400 mA/g) and 1 C (2000 mA/g), and the results were shown in FIGS. 12a-12i sequentially.

As shown in FIGS. 12a-12e, for the half cells of Examples 6~10, after 100 cycles at 0.2 C, charge capacity was 2600-2780 mAh/g and capacity retention ratio was 86-99%. And, in case charge/discharge was conducted at 0.2 C, charge capacity was retained relatively stable during 100 cycles (almost 100%), indicating that the formed surface layer is maintained without damage.

And, after 100 cycles at 1 C, charge capacity was 2190~2434 mAh/g and capacity retention ratio was 90%. Thus, in case charge/discharge was conducted at 1 C, charge capacity was also retained relatively stable during 100 cycles, indicating that the formed surface layer is maintained without damage.

Meanwhile, FIGS. 12f-12i show that for the half cells of Reference Examples 3 and 4 and Comparative Examples 3 and 4, after 100 cycles at 0.2 C, charge capacity was less than 2400 mAh/g, which was lower than those of Examples 6-10, and capacity retention ratio was also low. And, after 100 cycles at 1 C, charge capacity was less than 1800 mAh/g, which was also much lower than those of Examples 6-10, and capacity retention ratio was also very low.

Therefore, it is confirmed that the negative-electrode active materials of Examples 1-5 and the half cells of Examples 6-10 comprising the same exhibit excellent capacity retention ratio and cycle life properties compared to those of Reference Examples and Comparative Examples.

Rate Properties

For the half cells of Examples 6-10, 1 cycle of charge/discharge was conducted at 1.5 to 0V, respectively at 0.2 C, 1 C, 2 C and 3 C to measure rate properties. As results, charge capacity was 2600-2774 mAh/g at 0.2 C, 2430-2600 mAh/g at 1 C, 2150~2373 mAh/g at 2 C, and 1875~2015 mAh/g at 3 C, and the ratio of 3 C charge capacity to 0.2 C charge capacity was 73%.

For the half cells of Reference Examples 3 and 4 and Comparative Examples 3 and 4, 1 cycle of charge/discharge was conducted at 1.5 to 0V, respectively 0.2 C and 1 C, to measure rate properties. As results, charge capacity was about 2275-2500 mAh/g at 0.2 C, but it rapidly decreased to about 1740-2000 mAh/g at 1 C. Thus, it was confirmed that high rate properties of the half cells of Reference Examples 3 and 4 and Comparative Examples 3 and 4 are not satisfactory.

It is considered that these results are caused because the negative-electrode active materials for rechargeable lithium battery of Examples 1-5 used in Examples 6-10 comprise a carbon layer having a three-dimensional porous structure comprising nanopores of a determined scale on its surface, and the nanopores can be filed with electrolyte to make the area in contact with the electrolyte large, thus activating intercalation/deintercalation of lithium. It was also considered that regularly well-ordered nanopores enables uniform diffusion of electrolyte, and a thin wall of uniform dimension shortens pathway of lithium ion and electrons at charge/discharge, thereby improving high rate properties.

Meanwhile, it is expected that the negative-electrode active materials of Reference Examples and Comparative Examples cannot exhibit these effects because nanopores and pore wall of scales as Examples do not form, or they do not have a three-dimensional porous structure as Examples.

The present invention is not limited to the foregoing examples and drawings attached hereto, and various modification or alteration can be made by a person of ordinary skill in the art without departing from the aspect and scope of the present invention as described in the claims appended hereto.

The invention claimed is:

1. Negative-electrode active material for rechargeable lithium battery comprising:
    a core comprising material capable of doping and dedoping lithium; and
    a carbon layer formed on the surface of the core,
    wherein the carbon layer has a three dimensional porous structure comprising nanopores having average diameter of 100 nm to 300 nm, regularly ordered on the carbon layer with a pore wall having thickness of 40 nm to 150 nm placed therebetween.

2. The negative-electrode active material for rechargeable lithium battery according to claim 1, wherein the negative-electrode active material has a characteristic peak at 100 eV and/or 104 eV, and does not have any substantial peak at 105 eV and 110 eV in the X-ray photoelectron spectroscopy graph.

3. The negative-electrode active material for rechargeable lithium battery according to claim 1, wherein the nanopore has an average diameter of 30 nm to 150 nm, after conducting charge/discharge.

4. The negative-electrode active material for rechargeable lithium battery according to claim 1, wherein the thickness of the pore wall between the nanopores is 40 nm to 120 nm, after conducting charge/discharge.

5. The negative-electrode active material for rechargeable lithium battery according to claim 1, wherein the material capable of doping and dedoping lithium comprises one or more kinds of Group 14 or 15 element-containing material, selected from the group consisting of Si, $SiO_x(0<x<2)$, Si—$Y_1$ alloy, Sn, $SnO_2$, Sn—$Y_2$, Sb and Ge (wherein, $Y_1$ and $Y_2$ are one or more kinds of atoms selected from the group consisting of alkali metals, alkaline earth metals, Group 13 atoms, Group 14 atoms, transition metals and rare earth atoms, provided that $Y_1$ is not Si, and $Y_2$ is not Sn).

6. The negative-electrode active material for rechargeable lithium battery according to claim 5, wherein $Y_1$ and $Y_2$ are one or more kinds of atoms capable of binding with Si or Sn, selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Si, Sn, In, Ti, Ge, P, As, Sb, Bi, S, Se, Te, and Po.

7. The negative-electrode active material for rechargeable lithium battery according to claim 1, wherein the material capable of doping and dedpoing lithium exists as multiple particles, and carbon materials are further comprised between the multiple particles in the core.

8. The negative-electrode active material for rechargeable lithium battery according to claim 1, wherein the core further comprises an oxide of the material capable of doping and dedpoing lithium.

9. The negative-electrode active material for rechargeable lithium battery according to claim 1, wherein the material capable of doping and dedpoing lithium has a crystalline structure and crystalline grain in the crystalline structure has an average diameter of 20 nm to 100 nm.

10. The negative-electrode active material for rechargeable lithium battery according to claim 1, wherein the material capable of doping and dedpoing lithium has a structure comprising crystalline grains dispersed in an amorphous matrix, after conducting charge/discharge.

11. The negative-electrode active material for rechargeable lithium battery according to claim 10, wherein the dispersed crystalline grain has an average diameter of 2 nm to 5 nm.

12. The negative-electrode active material for rechargeable lithium battery according to claim 1, wherein the carbon layer has a thickness of 1 nm to 30 nm.

13. The negative-electrode active material for rechargeable lithium battery according to claim 1, wherein the carbon layer comprises disordered carbon.

14. The negative-electrode active material for rechargeable lithium battery according to claim 13, wherein the carbon layer has a Raman integrated intensity ratio D/G (I(1360)/I(1580)) of 0.1 to 2.

15. The negative-electrode active material for rechargeable lithium battery according to claim 1, wherein the negative-electrode active material comprises 5 wt % to 40 wt % of carbon, based on the total amount of the negative-electrode active material for rechargeable lithium battery.

16. The negative-electrode active material for rechargeable lithium battery according to claim 1, wherein the negative-electrode active material has specific surface area of 50 $m^2$/g to 200 $m^2$/g.

17. Rechargeable lithium battery comprising
    a positive electrode comprising positive-electrode active material;
    a negative electrode comprising negative-electrode active material according to claim 1; and
    an electrolyte.

18. The rechargeable lithium battery according to claim 17, wherein the battery shows 94% or more of coulombic efficiency after conducting 30 cycles or more of charge and discharge.

* * * * *

UNITED STATES PATENT AND TRADEMARK OFFICE
CERTIFICATE OF CORRECTION

PATENT NO. : 8,669,008 B2
APPLICATION NO. : 13/239912
DATED : March 11, 2014
INVENTOR(S) : Jaephil Cho et al.

It is certified that error appears in the above-identified patent and that said Letters Patent is hereby corrected as shown below:

Title page, item (75) Inventors, line 6: delete "Daaejeon" and insert therefor --Daejeon--.

Claims

Column 20, line 3, claim 7, delete "dedpoing" and insert therefor --dedoping--; column 20, line 9, delete "dedpoing" and insert therefor --dedoping--; column 20, line 12, claim 9, delete "dedpoing" and insert therefor --dedoping--; column 20, line 17, claim 10, delete "dedpoing" and insert therefor --dedoping--.

Signed and Sealed this
Sixteenth Day of February, 2016

Michelle K. Lee
*Director of the United States Patent and Trademark Office*